(12) United States Patent
Liu et al.

(10) Patent No.: US 9,065,381 B2
(45) Date of Patent: Jun. 23, 2015

(54) ELECTRICALLY ADJUSTABLE ANTENNA CONTROL SYSTEM AND METHOD

(75) Inventors: Yingyu Liu, Gaungzhou (CN); Zefeng Ma, Gaungzhou (CN)

(73) Assignee: Comba Telecom System (China) Ltd, Gaungzhou, Guangdong Province (CN)

(*) Notice: Subject to any disclaimer, the term of this patent is extended or adjusted under 35 U.S.C. 154(b) by 289 days.

(21) Appl. No.: 13/882,506

(22) PCT Filed: Oct. 28, 2011

(86) PCT No.: PCT/CN2011/081481
§ 371 (c)(1),
(2), (4) Date: May 16, 2013

(87) PCT Pub. No.: WO2012/059026
PCT Pub. Date: May 10, 2012

(65) Prior Publication Data
US 2014/0197763 A1    Jul. 17, 2014

(30) Foreign Application Priority Data
Nov. 1, 2010    (CN) .......................... 2010 1 0529379

(51) Int. Cl.
H01Q 3/32    (2006.01)
H02P 31/00   (2006.01)
H01Q 1/24    (2006.01)

(52) U.S. Cl.
CPC ................. *H02P 31/00* (2013.01); *H01Q 3/32* (2013.01); *H01Q 1/246* (2013.01)

(58) Field of Classification Search
USPC ............. 318/3, 264, 265, 266, 280, 283, 286, 318/466–468; 343/700 R, 772, 777, 778, 343/878
See application file for complete search history.

(56) References Cited

U.S. PATENT DOCUMENTS

| 3,793,634 | A  | * | 2/1974 | Heller et al. | 342/80 |
| 6,195,060 | B1 | * | 2/2001 | Spano et al. | 343/766 |
| 8,436,779 | B2 | * | 5/2013 | Clifford et al. | 343/765 |
| 8,456,376 | B2 | * | 6/2013 | Yang et al. | 343/882 |

FOREIGN PATENT DOCUMENTS

| CN | 1734227 A | 2/2006 |
| CN | 2872622 Y | 3/2006 |

* cited by examiner

*Primary Examiner* — Bentsu Ro
(74) *Attorney, Agent, or Firm* — Molins & Co Pty Ltd

(57) ABSTRACT

An electrically adjustable antenna control system includes a controller, an actuation mechanism controlled by the controller, and a feedback loop connected to both of the controller and actuation mechanism. Herein, the controller includes a control board and its imbedded program. The actuation mechanism includes a DC geared motor controlled by the control board and embedded program and an electrically adjustable antenna phase shifter driven by the geared motor. The feedback loop has a travel plate electrically coupled to both of the control board and DC geared motor and a counter device installed on the geared motor. The present invention also provides an electrically adjustable antenna control method realized by the above-mentioned electrically adjustable antenna control system.

4 Claims, 4 Drawing Sheets

ELECTRICALLY ADJUSTABLE ANTENNA CONTROL SYSTEM AND METHOD

FIELD OF THE INVENTION

The present invention relates to technical field of antenna control and more particularly, relates to an electrically adjustable antenna control system and method.

BACKGROUND OF THE INVENTION

As an important part of an electrically adjustable antenna, a motor plays an important role. Specifically, the phase shifter and the antenna panel can be adjusted by driving of the motor, thus effectively changing radiation direction of the antenna.

In industry, generally a stepper motor is used to drive the phase shifter, the antenna panel and the like of the antenna. It has the advantages of high control accuracy and simple control algorithm and also has the disadvantages of large size, high cost, as well as motor stall occurred due to small torque in low temperature environment.

Meanwhile, a brushless motor with large torque is also employed in the industry to overcome problem of motor stall in low temperature but high cost is also resulted.

Using of a geared motor may overcome the above drawbacks and advantages such as small size, large torque and low cost can be obtained. However, it is hard to control locating tolerance generated by inertia when stopping the motor, thus resulting in low accuracy.

It is therefore desired to provide an electrically adjustable antenna control system and method for eliminating the above drawbacks existing in prior art technique.

SUMMARY OF THE INVENTION

The object of the embodiment of the present invention is to provide an electrically adjustable antenna control system and method, which effectively eliminates motor stall problem due to insufficient torque in low temperature environment and meets requirement of motor control precision with low cost, thus being able to precisely control the electrically adjustable antenna such as the phase shifter and the antenna panel and so on.

To achieve above object, the following solution is proposed.

An electrically adjustable antenna control system includes a controller, an actuation mechanism controlled by the controller, and a feedback loop connected to both of the controller and actuation mechanism. Herein, the controller includes a control board and its imbedded program. The actuation mechanism includes a DC geared motor controlled by the control board and embedded program and an electrically adjustable antenna phase shifter driven by the geared motor. The feedback loop has a travel plate electrically coupled to both of the control board and DC geared motor and a counter device installed on the geared motor.

The present invention also provides an electrically adjustable antenna control method realized by the above-mentioned electrically adjustable antenna control system.

At first, two endpoints of a path between two contact points of two travel switches of the travel plate are defined as a starting point and an ending point respectively. The distance between the phase shifter and starting point is defined as an actual distance. The distance between the phase shifter at a target location in the path and the starting point is defined as a target distance. The deviation between the actual distance and target distance a distance, which is defined between an actual location of the phase shifter and starting point, and the target distance is defined as locating tolerance. The sum of the target distance and locating tolerance under the condition of meeting requirement is defined as target range. The method includes the following steps.

Step 601: start the process;

Step 602: the control board determines whether the actual distance of the phase shifter is larger than the target distance;

Step 603: in case that the actual distance is large than target distance of the phase shifter, than the control board sets reverse operation flag of the motor; otherwise, Step 604: the control board sets forward operation flag of the motor;

Step 605: determine whether the actual distance of the phase shifter is located within the target range and if yes, then perform the following steps 609 and 610 listed below in turn; and if no, then perform the steps 606-608 and then continue performing the steps 602-605 until it is determined that the actual distance of the phase shifter is already within the target range in step 605, and next, perform the step 609 and 610;

Step 606: the control board continues to calculate and set operation speed of the motor;

Step 607: set the operation direction of the motor;

Step 608: drive the motor to operate;

Step 609: set corresponding flags and stop the motor;

Step 610: end the entire process.

Compared to conventional technology, the present invention has the following good effects.

As a DC geared motor is employed, and the motor is controlled by trapezoidal speed control method, problem such as motor stall caused by insufficient torque under low temperature is eliminated effectively. In addition, the control precision requirement of the motor is also met with low cost, thereby components of the electrically adjustable antenna such as the phase shifter and reflective plate the antenna panel being controlled precisely.

DETAILED DESCRIPTION OF THE INVENTION

A plenty of embodiments of the invention will be described in detail in conjunction with accompany drawings.

The present invention provides an electrically adjustable antenna control system and method. As shown in FIGS. 1-7, the electrically adjustable antenna control system 100 includes a controller 10, an actuation mechanism 20 controlled by the controller 10, and a feedback loop 30 connected to both of the controller 10 and actuation mechanism 20. The controller 10, actuation mechanism 20 and feedback loop 30 constitute together a closed system.

Figure 1:
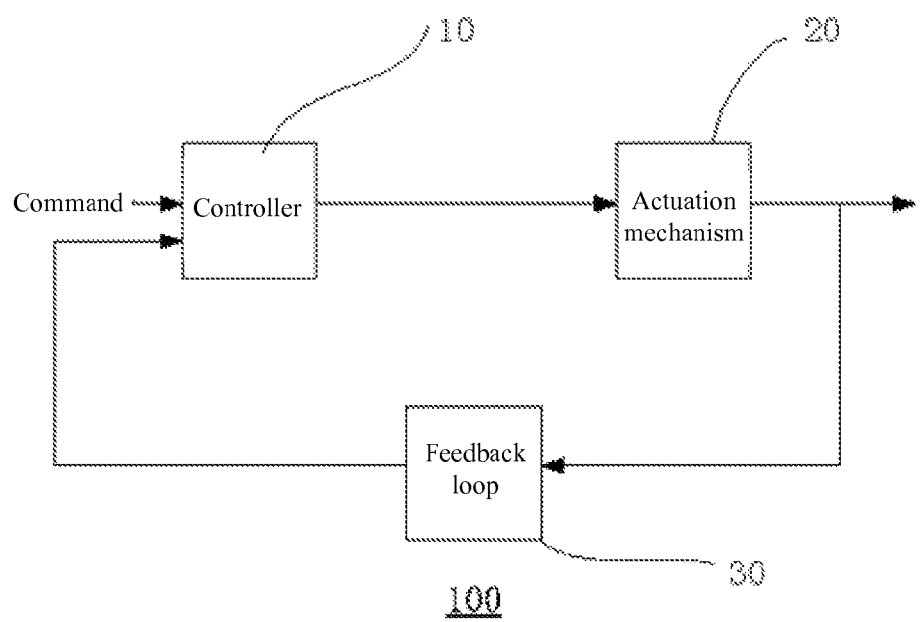
FIG. 1 shows a block diagram of an electrically adjustable antenna control system according to the invention.
Figure 2:
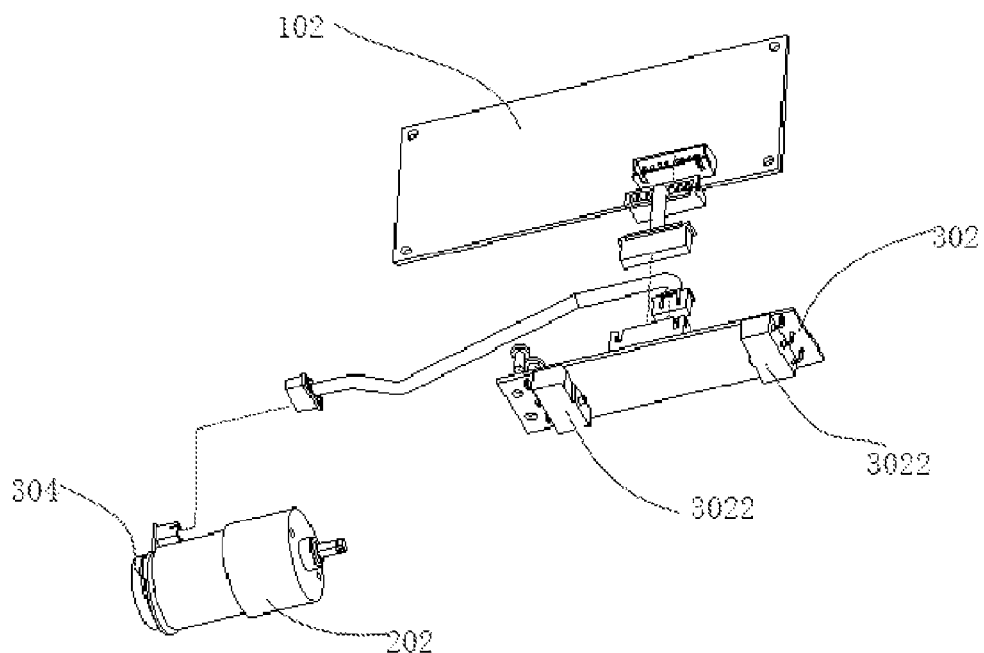
FIG. 2 shows detailed structural view of the components of the electrically adjustable antenna control system illustrated in FIG. 1.

FIG. 2 denotes structural view of the detailed components forming the electrically adjustable antenna control system of FIG. 1. As shown in FIG. 2, the controller 10 includes a control board 102 and embedded program thereof. The actuation mechanism 20 includes a DC geared motor 202 controlled by the control board 102 and its embedded program and an electrically adjustable antenna driven by the DC geared motor 202 (in present embodiment, it is a phase shifter of the antenna that is driven by the control board). The feedback loop 30 includes a travel plate 302 electrically connected to both of the control board 102 and DC geared motor 202, and a counter device 304 mounted on the DC geared motor 202.

Figure 3:
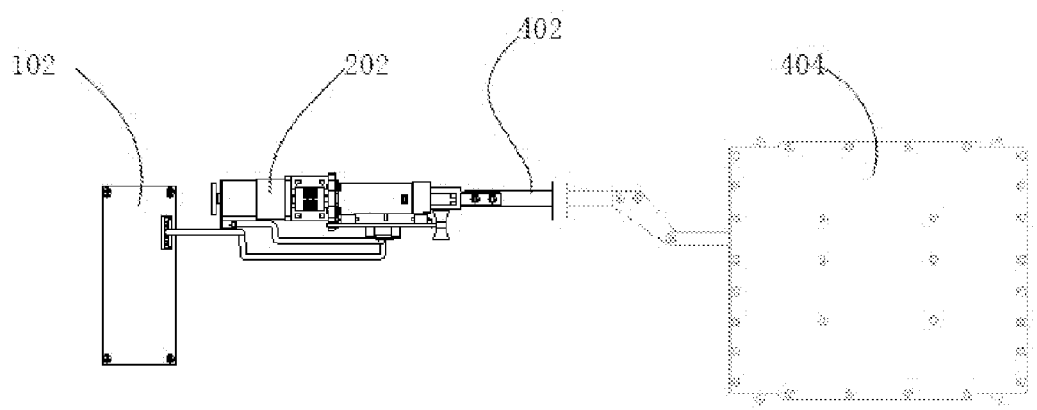
FIG. 3 shows a structural view illustrating the process of controlling the antenna phase shifter by the electrically adjustable antenna control system as shown in FIGS. 1-2.

FIG. 3 shows a structural view illustrating the process of controlling the antenna phase shifter by the electrically adjustable antenna control system as shown in FIGS. 1-2. In the figure, the antenna phase shifter 404 moves along with a drawbar 402 under the drive of the DC geared motor 202, thus changing the phase angle of the antenna elements. The control board 102 sends commands to the DC geared motor 202 such that the motor 202 is driven to rotate, thus resulting move of the drawbar 402. A stop block (not labeled) is provided on the drawbar 402 and moves between the two travel switches 3022 disposed on the travel plate 302 (see FIG. 2). When the stop block touches contacting point of a travel switch 3022, the motor 202 begin to rotate in a reverse direction and the counter device 304 starts counting. When the stop block touches the contacting point of the other travel switch 3022, the counter device 304 stops counting, and the total count value is returned to the control board 102. By using value of the counter device 304, the control board 102 calculates required revolutions of the motor to move to a corresponding location, hence changing the phase of the phase shifter 404 and further changing antenna pattern.

Using of the DC geared motor significantly increases torque value of the output end, eliminating problem such as low temperature motor stall caused by insufficient torque. In addition, a sensor installed on the rear end of the motor may be used to count. Based on desired precision, the number n per revolution of the motor is set. Furthermore, the resolution of the motor output end may be calculated as 360°/(n*m) based on the reduction ratio m:1 of the reduction box. For example, in case that the count value is 2 per resolution of the motor and the reduction ratio of the reduction box is 60:1, then the precision of the sensor is 3°. The counter device 304 may be a sensor such as a HALL sensor, photoelectric sensor and the like.

Figure 4:
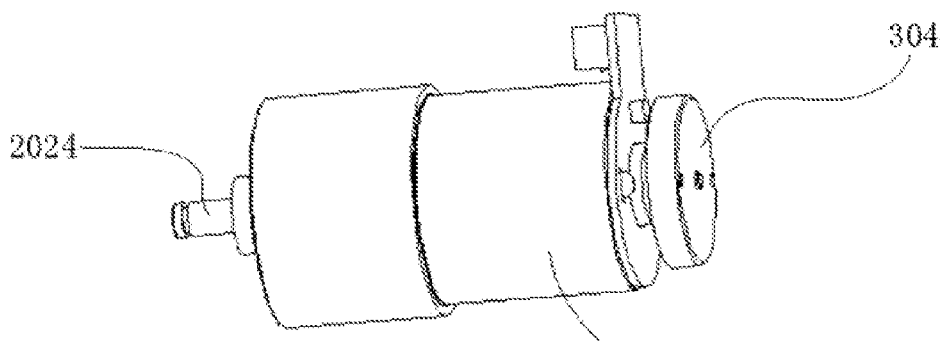
FIG. 4 shows a DC geared motor and its counter device of the electrically adjustable antenna control system of the present invention.
Figure 5:
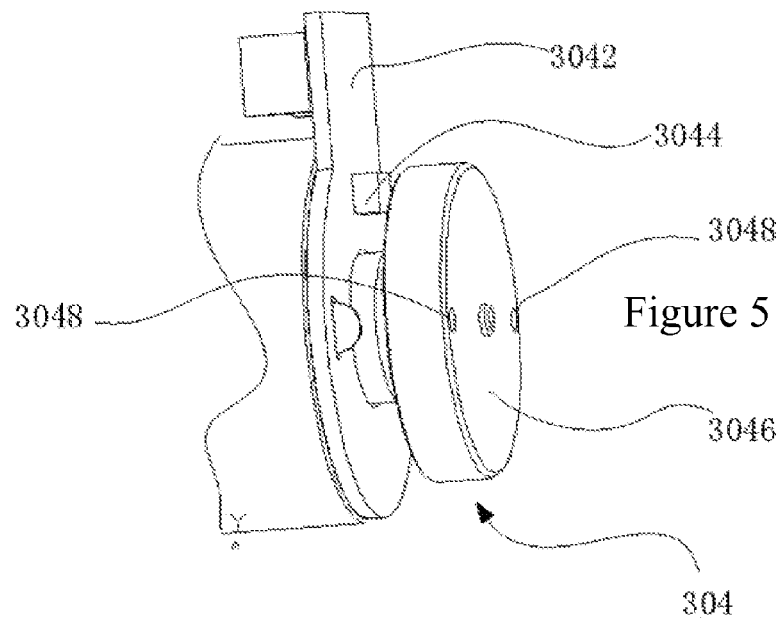
FIG. 5 shows an enlarged view of the construction of FIG. 4, illustrating the counter device installed on the DC geared motor.

In this embodiment, a HALL sensor is used as the counter device 304. Referring to FIGS. 4 and 5, the counter device 304 includes a sensor circuit board 3042 secured on the rear end of the motor 202, a HALL sensor 3044 disposed on the sensor circuit board 3042, a rotary disc 3046 connected with a motor shaft 2024 of the motor 202 so as to rotate together with the shaft 2024, and a pair of permanent magnets 3048 located on the rotary disc 3046. When the motor 202 operates, the rotary disc 3046 will be driven to rotate. During rotation of the rotary disc 3046, the HALL sensor 3044 will generate pulse when the permanent magnet 3048 passes through its upper end. The rotary location of the motor 202 may be calculated by recording pulse numbers.

In use of the electrically adjustable antenna, the displacement required by a slider of the phase shifter 404 may be determined according to specific electrical characteristics requirement. After receiving the corresponding commands, the control board 102 will calculate the steps to rotate by the motor 202 (each pulse received by the control board 102 from the HALL sensor is defined as 1 step). Then, the operation of the motor 202 is controlled under the following principles.

The electrically adjustable antenna control system 100 of the invention is intended to transform rotary movement of the motor 202 into linear movement and cause the slider of phase shifter 404 of the electrically adjustable antenna to be moved within a certain path (herein, the two endpoints of the path are defined as a starting point and an ending point). Furthermore, the slider can stay on certain location within the path according to requirement. Moreover, locating tolerance meets certain need. In present system 100, the distance of the path is that between the contacting points of the two travel switches 3022 of the travel plate 302.

Herein, the following definitions are used throughout the specification.

The distance between the phase shifter and starting point is defined as an actual distance.

The distance between the phase shifter at a target location in the path and the starting point is defined as a target distance.

The deviation between the actual distance defined between an actual location of the phase shifter and starting point and the target distance is defined as locating tolerance.

The sum of the target distance and locating tolerance under the condition of meeting requirement (permitted by the system) is defined as target range.

The rotation direction along which the motor rotates to move the phase shifter from the starting point to the ending point is defined as forward direction.

The rotation direction along which the motor rotates to move the phase shifter from the ending point to the starting point is defined as reverse direction.

The period of motor control is 2 ms, and in each control period, the speed change of the motor will be calculated according to the actual distance, speed and target distance, thus obtaining the operation status of the motor in a next operation period. By this manner, the operation of the motor is controlled such that the phase shifter will gradually move to the target distance. The motor will be stopped when the actual distance of the phase shifter is within the above target range.

Figure 6:
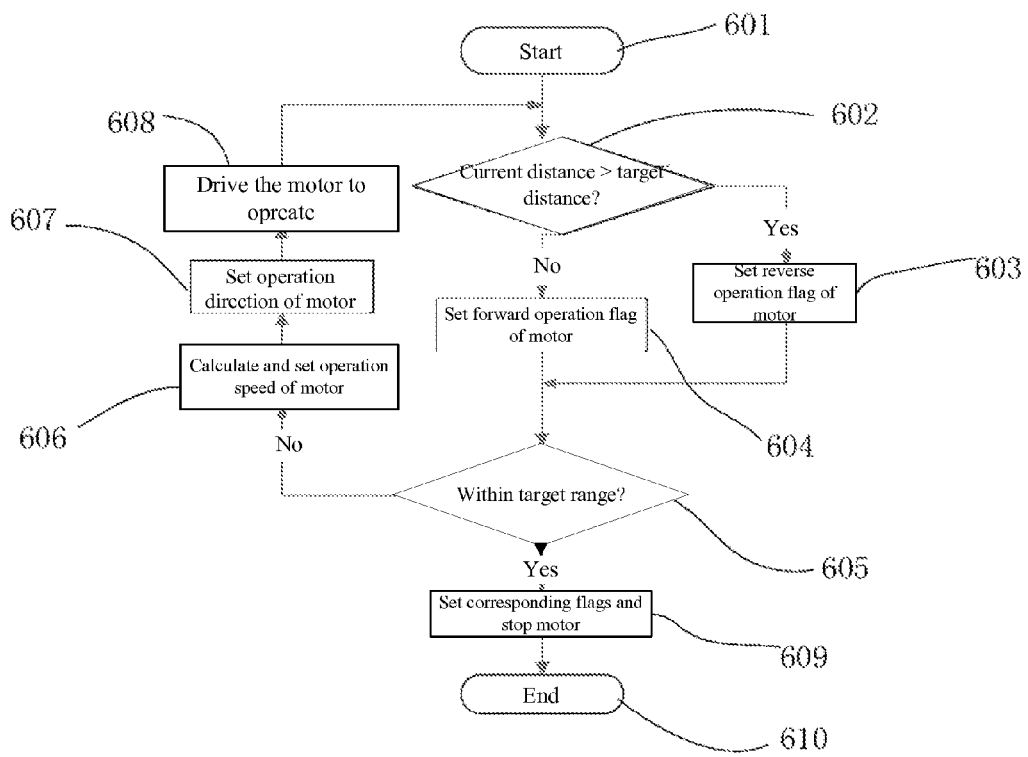
FIG. 6 shows a control flow diagram of the DC geared motor.

The flow chart of the motor control is denoted in FIG. 6. As shown in FIG. 6, it is supposed that the actual distance of the phase shifter is 0 (in other words, the phase shifter is at the starting point), the target distance is 1000 steps, and the target range is set to be within 1000±10 steps moved by the phase shifter. Under the above premise, it is clear that the actual distance is smaller than the target distance. The operation direction of the motor is set to be forward direction based on the entire process and the speed of the motor is also set. After that, the motor starts. The motor will enter into next period 2 ms later, and the above process is repeated until the motor arrives at the target range, thus finishing the command of this time.

As it is not easy to control a DC geared motor which has low locating precision, a trapezoidal speed control method is employed in present invention to reduce locating tolerance caused by inherent inertia of the control system 100 such that the locating precision meets system requirement. The present invention also proposes an electrically adjustable antenna control method performed by the above control system 100. As shown in FIGS. 1-2 and 6, at first the process is started (step 601). Then, the control board 102 determines whether the actual distance of the phase shifter 404 is larger than the target distance (step 602). In case that the actual distance is large than target distance of the phase shifter 404, than the control board 102 sets reverse operation flag of the motor 202 (step 603); otherwise, the control board 102 sets forward operation flag of the motor 202 (step 604). Next it is determined whether the actual distance of the phase shifter 404 is located within the target range (step 605) and if yes, then corresponding flag is set and the motor is stopped (step 609) and the entire process is ended (step 610). If no, the control board 102 continues to calculate and set the operation speed of the motor (step 606) and set operation direction of the motor (step 607), and then drive the motor to operate (step 608). Afterwards, the steps 602-605 are repeated until it is determined that the actual distance of the phase shifter 404 is already within the target range in step 605, and next, corresponding flag is set and the motor is stopped (step 609), and the entire process is ended (step 610).

Figure 7:
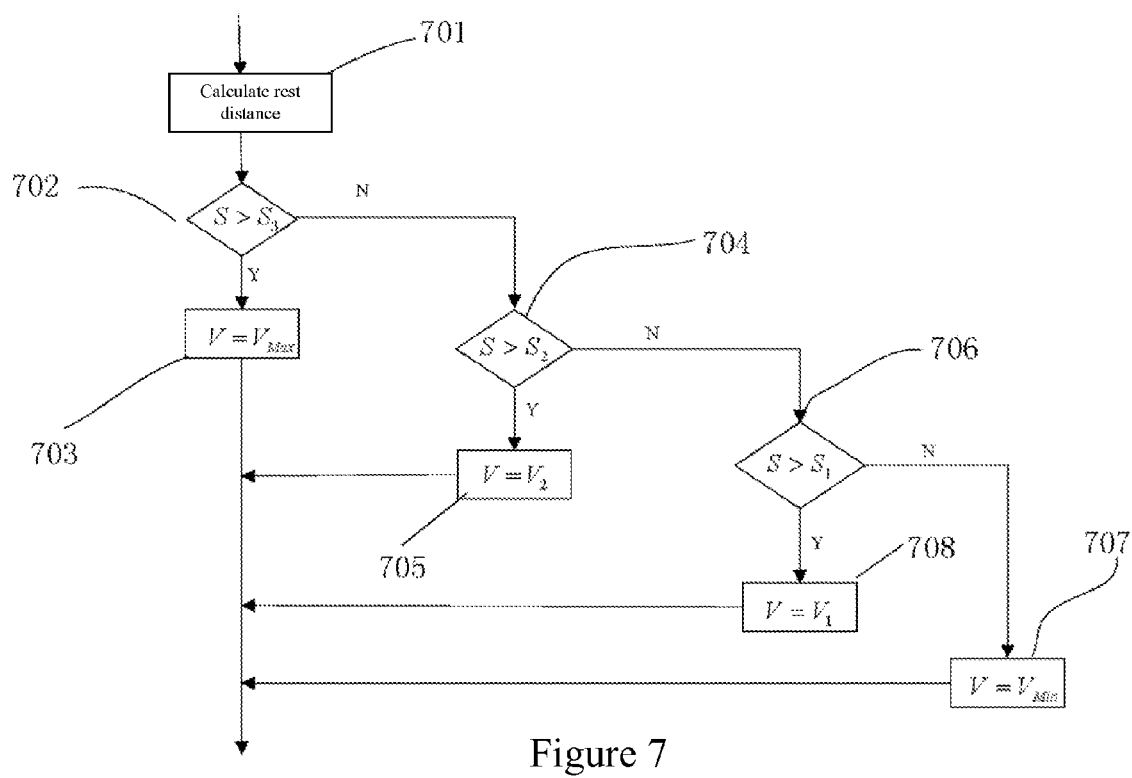
FIG. 7 shows a flow diagram of trapezoidal speed control of the DC geared motor.

More specifically, the trapezoidal speed control method of the present invention controls the operation speed in step 606. Firstly, some terms should be defined. Assume that during operation the motor has some different speeds $V_{min}$, $V_1$, $V_2$ and $V_{max}$, wherein $V_{min} < V_1 < V_2 < V_{max}$, $V_{min}$ is minimum speed, and $V_{max}$ is maximum speed. The different between the actual distance and target distance of the phase shifter 404 is defined as the rest distance S. At the same time, assume that the rest distance S has three threshold values, that is, a first threshold value $S_3$, a second threshold value $S_2$ and a third threshold value $S_1$, wherein $0 < S_1 < S_2 < S_3$. As shown in FIG. 7, at first, the rest distance S of the phase shifter 404 is calculated (by the control board 102) (step 701). Then, it is determined whether the rest distance S of the phase shifter 404 is larger than the first threshold value $S_3$ (step 702). If yes, then the motor is set to have a maximum speed $V_{max}$ (step 703). Otherwise, it is judged whether the rest distance S of the phase shifter 404 is larger than the second threshold value $S_2$ (step 704). If yes, the motor is set to have a speed $V_2$ (step 705). Otherwise, it is further judged whether the rest distance S of the phase shifter 404 is larger than the third threshold value $S_1$ (step 706). If yes, the motor is set to have a speed $V_1$ (step 708). Otherwise, the motor is set to have a speed $V_{min}$ (step 707).

Figure 8:
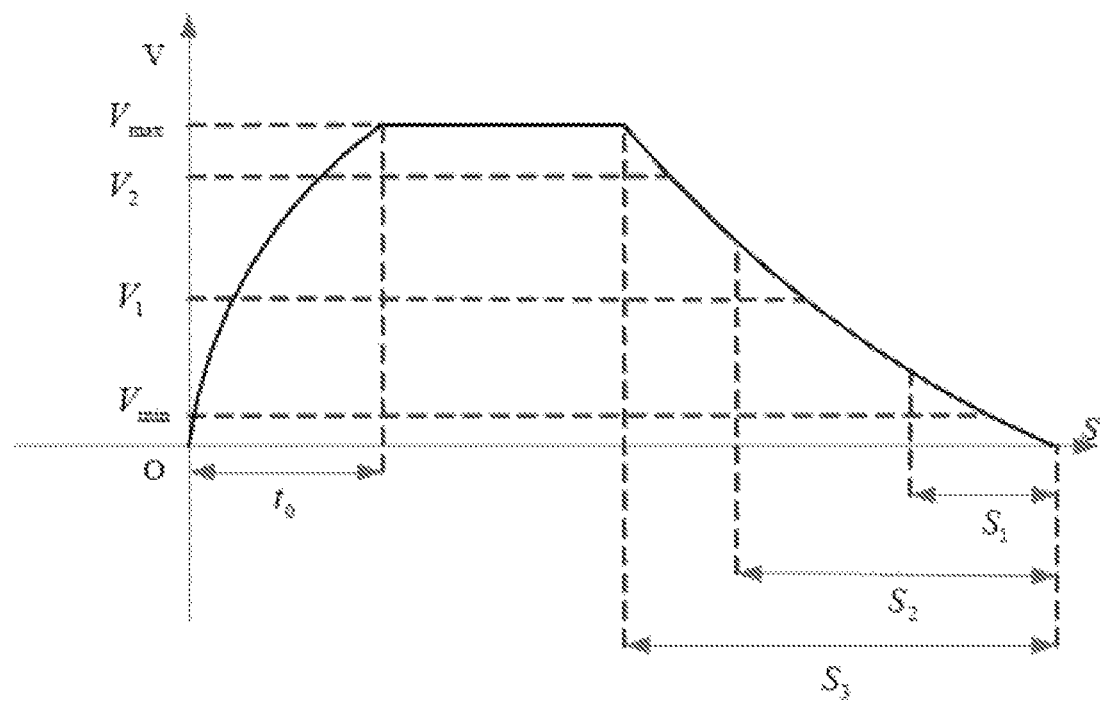
FIG. 8 shows speed curve of the motor.

Suppose that N represents the total number of the controllable speeds ranging from $V_{min}$ to $V_{max}$. The smoothness of the trapezoidal speed control is relevant to the number N. If N is larger, then the trapezoidal speed control will have better smoothness. On the contrary, the trapezoidal speed control will have worse smoothness. In ideal condition (N tends to be infinite, in other word, the system speed between $V_{min}$ and $V_{max}$ can be adjusted continuously), the speed curve of the motor operation is shown in FIG. 8.

When the rest distance $S > S_3$, the motor will operate with increased speed and after time $t_0$, the motor will operate at the maximum speed $V_{max}$. The motor speed will be reduced to $V_2$ when it is close to the first threshold value $S_3$. Afterwards, the motor will operate at $V_2$. When the motor is close to the second threshold value $S_2$, its speed will be decreased to $V_1$.

As a DC geared motor is employed, and the motor is controlled by trapezoidal speed control method, problem such as motor stall caused by insufficient torque under low temperature is eliminated effectively. In addition, the control precision requirement of the motor is also met with low cost, thereby components of the electrically adjustable antenna such as the phase shifter and the antenna panel being controlled precisely.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. An electrically adjustable antenna control system comprising a controller, an actuation mechanism controlled by the controller, and a feedback loop connected to both of the controller and actuation mechanism, wherein,
    the controller comprises a control board and its embedded program; the actuation mechanism includes a DC geared motor controlled by the control board and the embedded program and an electrically adjustable antenna phase shifter driven by the geared motor; the feedback loop has a travel plate electrically coupled to both of the control board and the DC geared motor and a counter device installed on the geared motor;
    the DC geared motor is connected to the antenna phase shifter via a drawbar having a stop block; there are two travel switches on the travel plate, and each travel switch is provided with a contacting point;
    the control board sends commands to the DC geared motor to drive the motor to rotate and in turn, cause the movement of the drawbar; the stop block moves between the two travel switches of the travel plate; when the stop block touches the contacting point of a travel switch, the motor begin to rotate in a reverse direction and the counter device starts counting; and when the stop block touches the contacting point of the other travel switch, the counter device stops counting, and the total count value is returned to the control board; by using value of the counter device, the control board calculates required revolutions of the motor to move to a corresponding location.

2. The electrically adjustable antenna control system according to claim 1, wherein the counter device includes a sensor circuit board secured on the rear end of the motor, a HALL sensor disposed on the sensor circuit board, a rotary disc connected with a motor shaft of the motor so as to rotate together with the shaft, and permanent magnets located on the rotary disc.

3. An electrically adjustable antenna control method realized by the system according to claim 1, wherein,
    two endpoints of a path between two contact points of two travel switches of the travel plate are defined as a starting point and an ending point respectively; the distance between the phase shifter and starting point is defined as an actual distance; the distance between the phase shifter at a target location in the path and the starting point is defined as a target distance; the deviation between a distance, which is defined between an actual location of the phase shifter and starting point, and the target distance is defined as locating tolerance; the sum of the target distance and locating tolerance is defined as target range; the method comprising the following steps;
    Step 601: start the process;
    Step 602: the control board determines whether the actual distance of the phase shifter is larger than the target distance;
    Step 603: in case that the actual distance is large than target distance of the phase shifter, than the control board sets reverse operation flag of the motor; otherwise,
    Step 604: the control board sets forward operation flag of the motor;
    Step 605: determine whether the actual distance of the phase shifter is located within the target range and if yes, then perform the following steps 609 and 610 listed below in turn; and if no, then perform the steps 606-608 and then continue performing the steps 602-605 until it is determined that the actual distance of the phase shifter is already within the target range in step 605, and next, perform the step 609 and 610;

Step 606: the control board continues to calculate and set operation speed of the motor;

Step 607: set the operation direction of the motor;

Step 608: drive the motor to operate;

Step 609: set corresponding flags and stop the motor; and

Step 610: end the entire process.

4. The electrically adjustable antenna control method according to claim 3, wherein, assume that during operation the motor has some different speeds $V_{min}$, $V_1$, $V_2$ and $V_{max}$, wherein $V_{min} < V_1 < V_2 < V_{max}$, $V_{min}$ is minimum speed, and $V_{max}$ is maximum speed; the different between the actual distance and target distance of the phase shifter is defined as the rest distance S; and also assume that the rest distance S has three threshold values, that is, a first threshold value $S_3$, a second threshold value $S_2$ and a third threshold value $S_1$, wherein $0 < S_1 < S_2 < S_3$, the step of the control board continuing to calculate and set operation speed of the motor comprising the following steps:

step 701: the rest distance S of the phase shifter is calculated by the control board;

step 702: it is determined whether the rest distance S of the phase shifter is larger than the first threshold value $S_3$, if yes, then perform step 703, otherwise, perform step 704;

step 703: the motor is set to have a maximum speed;

step 704: it is judged whether the rest distance S of the phase shifter is larger than the second threshold value $S_2$, if yes, perform step 705, otherwise, perform step 706;

step 705: the motor is set to have a speed;

step 706: it is further judged whether the rest distance S of the phase shifter is larger than the third threshold value $S_1$, if yes, perform step 708, otherwise, perform step 707;

step 707: the motor is set to have a speed $V_{min}$;

step 708: the motor is set to have a speed $V_1$.

\* \* \* \* \*